May 19, 1942.  D. C. PRINCE  2,283,697
ELECTRORESPONSIVE DEVICE
Filed April 3, 1940
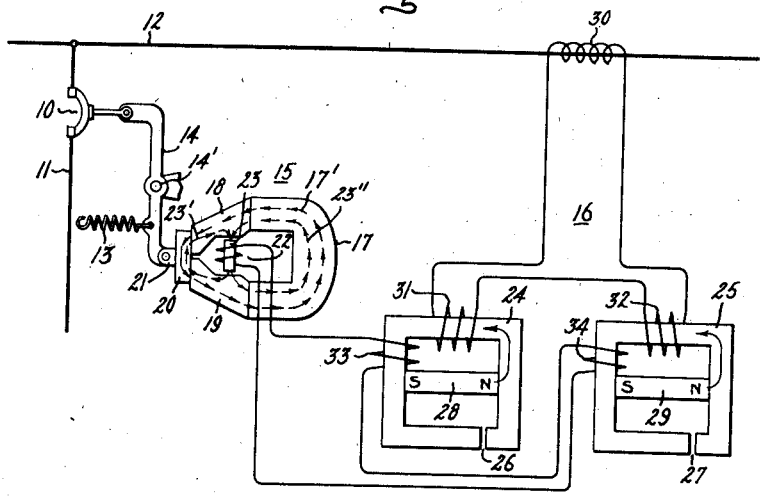
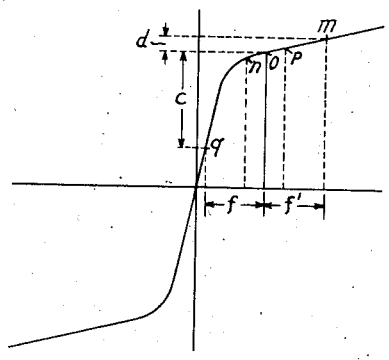
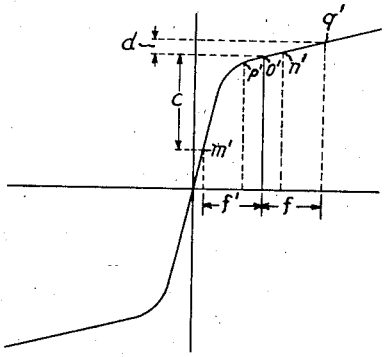
Inventor:
David C. Prince,
by Harry E. Dunham
His Attorney.

Patented May 19, 1942

2,283,697

UNITED STATES PATENT OFFICE 2,283,697

ELECTRORESPONSIVE DEVICE

David C. Prince, Swarthmore, Pa., assignor to General Electric Company, a corporation of New York Application April 3, 1940, Serial No. 327,616

4 Claims. (Cl. 175—294)

My invention relates to electroresponsive devices and more particularly to such devices as applied to high-speed releasing or tripping mechanisms for initiating the opening of circuit breakers in response to abnormal electrical conditions.

In high-tension power systems operating at commercial frequencies, the duty of quickly isolating a fault, such as a short circuit, for example, falls upon the circuit breakers controlling the affected part of the system. There are a number of reasons for high-speed tripping of alternating-current circuit breakers, the most important of which is that the amount of load that can be carried by a system through a fault is very much greater as the duration of the fault is decreased, that is, if the fault hangs on, the voltage of the whole system is pulled down and various pieces of synchronous apparatus fall out of step. Generators may get out of step with each other and synchronous motors may get out of step with the generators supplying them. The necessity for such high-speed tripping precludes the use of the ordinary type circuit breaker in which the movable switch contact member is held in its closed position by means of latches, triggers, and the like because such devices introduce prohibitive delays in the operation of the interrupter. Although my invention is of general application, it is particularly advantageous in connection with quick acting circuit breakers of the type described and claimed in Reissue Patent No. 15,441 to John F. Tritle dated August 29, 1922.

In the Tritle type of circuit breaker, the movable circuit-interrupting member is strongly biased to the circuit-interrupting position and is held electromagnetically in the closed position. The release of the circuit-interrupting member is effected by a magnetizing winding or current conductor which is arranged to supply a unidirectional magnetism of such polarity as to decrease the holding effect of the flux of the holding electromagnet instantly upon a flow of current of predetermined value through the releasing winding or conductor in a predetermined direction.

Since in alternating-current circuits a fault may occur at any instant during the cycle, it is possible for the instantaneous current in the main power circuit to be flowing in either direction when it is desired to trip the circuit breaker for protective purposes. Accordingly, it is essential to provide a device which will produce a unidirectional current or voltage for tripping a circuit breaker having a "flux-shifting" tripping arrangement of the Tritle type described above regardless of the direction in which the instantaneous current in the power circuit to be protected is flowing and, therefore, irrespective of the direction in which energizing current or voltage is supplied to the electroresponsive device. It will be understood by those skilled in the art that the application of my invention is not limited to circuit breakers of the Tritle type.

In certain prior art arrangements, electroresponsive devices have been proposed for providing the tripping energy for high-speed circuit breakers. However, in all of these arrangements, a source of direct current was required in order for the apparatus to function properly. In many alternating-current systems, power is transmitted over long distances through uninhabited areas and the like but, nevertheless, protective apparatus, such as circuit breakers, are required. With the prior art arrangements, it was always necessary to provide a source of direct current in connection with the electroresponsive devices referred to above and this was often difficult where the apparatus was to be used in protecting an alternating-current power circuit in an out-of-the-way place, it being necessary to use batteries or other means which provided further difficulties.

It is an object of my invention, therefore, to provide an electroresponsive device for use in tripping a high-speed alternating-current circuit breaker wherein the necessity of a source of direct current is completely eliminated.

It is another object of my invention to provide an improved electroresponsive device which is entirely electrical in its operation for controlling an electric circuit in response to a predetermined electrical condition.

It is a further object of my invention to provide an electroresponsive device for controlling the tripping of electric circuit breakers which is entirely electrical in operation, thereby eliminating moving parts and the like, and which requires substantially no attention so that it may be satisfactorily located at an isolated place.

It is another object of my invention to provide a new and improved electroresponsive device which will produce a unidirectional current or voltage impulse in response to an abnormal electrical condition of the associated power circuit, regardless of the direction of the current or voltage of said power circuit at the instant the abnormal electrical condition occurs.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawing in which Fig. 1 is a schematic diagram of an arrangement embodying my invention, and Figs. 2 and 3 represent certain magnetic characteristics of my device to aid in the understanding of my invention.

Referring now to Fig. 1, I have illustrated an electric circuit breaker generally indicated at 10 for isolating the high-tension power circuit 11 from the high-tension power circuit 12 in response to a fault condition. Circuit breaker 10 is strongly biased to the open position by means of spring 13 acting on pivotally mounted lever 14 associated with circuit breaker 10. Circuit breaker 10 is held in the closed position by magnetic means comprising tripping device 15 which, in turn, is controlled by an electroresponsive device embodying my invention generally indicated at 16. Tripping device 15 includes a permanent magnet 17, soft pole pieces 18 and 19, and an armature 20 of similar material which is carried at 21 by lever 14 pivotally mounted at 14'. Normally, the magnetomotive force produced by the permanent magnet 17 is effective to hold the armature 20 in the closed magnetic circuit position shown in Fig. 1 against the bias of spring 13.

The tripping device 15 includes a tripping solenoid or coil 22 which is arranged when energized with a unidirectional current of a predetermined direction from electroresponsive device 16 to produce a flux in the magnetic circuit of tripping device 15 opposing that produced by the permanent magnet 17 in that portion of the magnetic circuit including the soft iron armature 20. This relationship is such that unidirectional energization of the trip coil 22 so weakens the holding force of magnet 17 at the armature 20 that the armature spring 13 rotates lever 14 in a clockwise direction thereby opening circuit breaker 10. This general type of tripping device, commonly known as the "flux-shifting" type, is shown, for example, in the above-mentioned reissue patent or in United States Letters Patent 2,130,871, granted September 20, 1938, upon an application of Eugene W. Boehne and assigned to the same assignee as the present invention.

The permanent-magnet portion 17 of tripping device 15 is preferably composed of a magnetic alloy comprising a precipitation hardened product basically an iron-nickel-aluminum alloy, and specifically a nickel-iron-aluminum and cobalt alloy of the character described and claimed in Ruder Patents 1,947,274 and 1,968,569. This magnetic alloy has certain highly desirable qualities for a permanent-magnet material, such as, for example, a magnetomotive force greatly in excess of that of ordinary permanent magnets. The pole pieces 18 and 19 are preferably composed of soft-iron laminations and are designed so as to collect the flux produced by the permanent magnet and concentrate it at that portion of the magnetic circuit including the soft-iron armature 20. The flux produced by the permanent magnet 17 in the closed magnetic circuit including the armature 20 can be generally designated by the flux arrows 17'.

The trip coil 22, which also preferably includes a soft-iron laminated core 23, is spaced from pole pieces 18 and 18 and arranged so as to be in shunt with the magnetic circuit including armature 20 and the adjacent portions of pole pieces 18 and 19. Therefore, when trip coil 22 is energized with a unidirectional current of a predetermined direction from electroresponsive device 16, the flux produced thereby tends to take two paths, namely, the path including the armature 20 indicated by the flux arrows 23' and a path through the permanent magnet 17 indicated by the flux arrows 23''. Therefore, the flux produced by the coil 22 is in the same direction as the main flux in the magnetic circuit including the permanent magnet 17 thereby having a magnetizing effect on the permanent magnet and in the opposite direction in the part of the circuit including the armature 20. Accordingly, the holding flux at the armature 20 is weakened to a predetermined extent so that the spring 13 is effective to open circuit breaker 10.

The reclosing of circuit breaker 10 may be accomplished in any suitable manner, such as by a mechanical connection, not shown, operatively interconnecting the breaker-closing mechanism, also not shown, and lever 14.

Some means of providing a unidirectional current of a predetermined direction in the tripping coil 22 is essential when the circuit breaker 10 is used for alternating-current circuit applications. In accordance with my invention, I provide electroresponsive device 16 which always produces a unidirectional energizing current for tripping coil 22 regardless of the instantaneous direction of current flow in power circuit 12 at the instant the abnormal electrical condition occurs which initiates the tripping action. Electroresponsive device 16 comprises a pair of saturated core current transformers having cores 24 and 25, respectively, each comprising a plurality of legs provided with a small air gap 26 and 27 respectively in one leg thereof, the purpose of which will be described hereinafter. Cores 24 and 25 are saturated under normal conditions by permanent magnets 28 and 29, respectively. The return legs of cores 24 and 25 by virtue of the adjustment of air gaps 26 and 27 cannot become saturated by the magnetomotive force of permanent magnets 28 and 29. A current proportional to that flowing in main power line 12 is obtained by means of current transformer 30 which is connected to energizing primary coils 31 and 32 associated with the normally saturated leg of cores 24 and 25, respectively. Windings 31 and 32, although connected in series with current transformer 30, are reversely wound so that, at any instant, the flux produced in core 24 due to the current flowing in winding 31 is opposite to the flux produced in core 25 due to the same current flowing in winding 32. Inductively related with the primary or energizing windings 31 or 32 are secondary windings 33 or 34 serially connected with one another as well as with tripping coil 22.

When there is no alternating current flowing through windings 31 and 32, the flux in the portion of cores 24 and 25 associated with these windings is maintained near the saturation point because of the magnetomotive force produced by permanent magnets 28 and 29. The latter are preferably formed of a nickel-iron-aluminum and cobalt alloy similar to the magnet 17 described above so as to produce a very high magnetomotive force.

As mentioned before, the primary windings 31 and 32 are reversely wound with respect to one another and connected in series with current transformer 30 associated with power circuit 12 so that the magnetizing force of the windings at any instant tends to increase the flux set up in one of the flux paths, such as core 24 by permanent magnet 28, while reducing the value of the flux set up by permanent magnet 29 in core 25. During the reverse half cycle of the alternating current in power line 12 and, hence, in windings 31 and 32, the opposite effect as to the flux of cores 24 and 25 will occur. Since the saturation of cores 24 and 25 is so adjusted that the normal alternating current flowing in windings 31 and 32 produces no appreciable effect, substantially no potential is induced in secondary windings 33 and 34. Furthermore, the negligible potentials induced in these windings by virtue of the differential relationship of windings 31 and 32 tend to oppose and neutralize one another so that, under normal conditions, substantially no current flows in trip coil 22.

Without intending to be bound by the theory advanced, the following discussion is offered to explain how a unidirectional current of a definite direction for trip coil 22 is obtained irrespective of the instantaneous direction of current flow in power circuit 12 when an abnormal electrical condition occurs. The permanent magnets 28 and 29 produce a flux in a direction indicated by the arrows in Fig. 1 sufficient to magnetize cores 24 and 25 to the values $o$ and $o'$, respectively, indicated on their respective BH or magnetization curves shown in Figs. 2 and 3. Under normal conditions, current flowing in winding 31 during one half cycle tends to increase the flux very slightly to the point represented by $p$ on the magnetization curve of Fig. 2 while at the same instant this current tends to decrease the flux in core 25 by a small amount to $p'$ represented on the magnetization curve of Fig. 3. For the opposite half cycle, the flux in core 24 is decreased to the point $n$ in Fig. 2 while the flux in core 25 is increased to the point $n'$ in Fig. 3. As may be observed, due to the fact that the transformers including cores 24 and 25 are operated above the knee of the magnetization curves shown in Figs. 2 and 3, the rates of change of flux in cores 24 and 25 are not only small but of substantially the same magnitude and opposite in direction so that the voltages induced in secondary windings 33 and 34 substantially neutralize one another whereby no current flows through trip coil 22.

If now, an abnormal current condition occurs in high-tension line 12, a proportional abnormal current flow is produced in windings 31 and 32. Assume, for example, that at the instant the fault occurs the direction of current flow is such as to decrease the flux in core 24 by opposing the normal magnetization produced by permanent magnet 28. If the current in power circuit 12 is sufficiently large, the demagnetizing force $f$ produced by winding 31 may be such as to reduce the flux in core 24 by an amount $c$ to the point $q$ shown on its magnetization curve in Fig. 2. At the same time, the current flowing in winding 32 tends to add the same magnetizing force $f$ to that produced by permanent magnet 29 upon core 25 but, since core 25 is normally saturated by permanent magnet 29, the flux is increased only a relatively small amount as indicated by $d$ to the point $q'$ on its magnetization curve in Fig. 3. Since change of flux $c$ in core 24 is much greater than the change of flux $d$ in core 25, there will be a difference in the potentials induced in the respective secondary windings 33 and 34 because these potentials are dependent upon the change of flux in the path with which each winding is interlinked. Therefore the voltage induced in winding 33 will be considerably larger than the voltage of opposite potential induced in winding 34 so that a resultant voltage obtains which causes current to flow through trip coil 22 of sufficient magnitude to cause tripping of circuit breaker 10.

If the abnormal current in high-tension line 12 should flow in the reverse direction from that assumed in the previous description, the magnetizing force $f'$ of the winding 31 then tends to add to the flux in core 24 produced by the permanent magnet 28 so that the resultant magnetization in core 24 is increased by an amount $d$ to the point $m$ on its magnetization curve, as indicated in Fig. 2. At the same time, the magnetizing force $f'$ of winding 32 opposes the flux produced by permanent magnet 29 in core 25 so that the resultant magnetization of core 25 is decreased by an amount $c$ to the point $m'$ on its magnetization curve as shown in Fig. 3. In this case, the predominating voltage which causes current to flow in trip coil 22 is induced in winding 34 where the greatest change in flux linkages occurs. However, the current flowing in trip coil 22 is in the same direction as when the predominating voltage for causing this current was obtained from secondary winding 33. Hence, it will be seen that, irrespective of the direction of the current flow in windings 31 and 32 when an abnormal electrical condition occurs, a unidirectional energizing current is always supplied to trip coil 22.

This might best be explained by considering the total flux conditions in both cores 24 and 25. Regardless of the direction of current flow in windings 31 and 32 under all conditions, the resultant flux in one core is decreased to a considerable extent while the resultant flux in the other core is increased only slightly. Consequently, the algebraic sum of the initial fluxes in cores 24 and 25 is always reduced when an abnormal current condition occurs and the current induced in trip coil 22 is a result of this decrease in total flux in the flux paths of cores 24 and 25 so that, irrespective of the direction of current flow in windings 31 and 32 at the instant the abnormal electrical condition obtains, a unidirectional energizing current is always supplied in trip coil 22.

If air gaps 26 and 27 were not provided in one of the legs of cores 24 and 25, respectively, permanent magnets 28 and 29 would cause saturation of these legs as well as of the legs with which windings 31 and 32 are associated. A current in windings 31 or 32, such as described above, which would decrease the flux in the associated leg of core 24 would tend to increase the flux in the other leg of the core. If now this leg were not provided with an air gap and, therefore, were saturated by the associated permanent magnet, a very high reluctance would be offered to the magnetizing force of windings 31 and 32 so as to cause improper functioning of the electroresponsive device 16. However, by providing a very small air gap at 26 and 27, the associated return legs of cores 24 and 25, respectively, will offer a low reluctance path to this useful flux which is produced by windings 31 or 32 when opposing the magnetization produced by the associated permanent magnets. It will be understood by those skilled in the art that a high coercive force is required to produce any flux change in permanent magnets 28 and 29. Therefore, the additional legs for cores 24 and 25 including air gaps 26 and 27, respectively, are provided which do not add to the coercive force necessary to drive the flux around the circuit by much more than the amount required by the air gaps. Suitable adjusting means may be provided for the air gaps so as to control the saturation accurately of the legs of cores 24 and 25 associated with windings 31 and 32, respectively.

Although I have described my invention as associated with a single-phase circuit breaker, it will be understood by those skilled in the art that it may equally well be utilized in connection with protecting polyphase circuits.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States is:

1. In combination, an electric conductor, an electroresponsive device, means associated with said conductor for causing said electroresponsive device to be operative in accordance with an abnormal electrical condition occurring in said conductor, said electroresponsive device comprising a pair of core members, a permanent-magnet biasing member for each of said core members for effecting substantial saturation of said core members during normal electrical conditions in said conductor, and means associated with said cores and having induced therein an excitation component which is always in the same direction when an abnormal electrical condition occurs in said conductor regardless of the instantaneous direction of current flow in said conductor at the instant said abnormal electrical condition occurs.

2. In combination, an electric conductor, an electroresponsive device, means associated with said conductor for causing said electroresponsive device to be operative in accordance with the current transmitted by said conductor, said electroresponsive device comprising a pair of core members each having a plurality of legs including an air gap in one of the legs of each of said cores, a permanent magnet for each of said cores arranged to bridge said air gaps for effecting substantial saturation of the legs of said core members not provided with air gaps during normal current conditions in said conductor, and means associated with said cores and having induced therein a unidirectional excitation component when an abnormal current condition occurs in said conductor irrespective of the instantaneous direction of the current flow in said conductor at the instant said abnormal current condition occurs.

3. An electroresponsive device comprising a pair of magnetic core members each having an air gap in one of the legs of said cores, means for establishing a unidirectional component of flux substantially constant in value in said core members to effect substantial saturation thereof including permanent magnets for each of said cores arranged to bridge said air gaps, means for establishing an alternating component of flux in each of said cores, said component established in one of said cores at any instant being equal and opposite to the component established in the other of said cores, and a pair of serially connected windings each associated with one of said cores having induced therein a resultant unidirectional excitation component whenever said unidirectional component of flux in one of said cores is reduced by a substantial amount due to said alternating component of flux.

4. The combination with an electric circuit and an electrical device operable in response to current flow in a predetermined direction of means inductively connecting said electric circuit and said electrical device comprising a pair of core members each having a plurality of legs including an air gap in one of said legs, a permanent magnet for each of said cores arranged to bridge said air gaps for effecting substantial saturation of the legs of said core members not provided with air gaps during normal current conditions in said electric circuit, means for establishing in each of said cores components of flux which at any instant are equal and opposite to one another and proportional to the current flowing in said electric circuit, and a pair of serially connected windings each associated with one of said cores and having induced therein a resultant current in said predetermined direction for operating said electrical device upon a rapid increase of current in said electric circuit in either direction.

DAVID C. PRINCE.